United States Patent
Eisl et al.

(10) Patent No.: US 9,357,450 B2
(45) Date of Patent: May 31, 2016

(54) METHOD AND DEVICE FOR DATA PROCESSING IN A MOBILE COMMUNICATION NETWORK

(75) Inventors: Jochen Eisl, Garching (DE); Gerhard Kuhn, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 364 days.

(21) Appl. No.: 13/147,303

(22) PCT Filed: Feb. 5, 2009

(86) PCT No.: PCT/EP2009/051337
§ 371 (c)(1),
(2), (4) Date: Aug. 1, 2011

(87) PCT Pub. No.: WO2010/088956
PCT Pub. Date: Aug. 12, 2010

(65) Prior Publication Data
US 2011/0310842 A1    Dec. 22, 2011

(51) Int. Cl.
*H04W 4/00* (2009.01)
*H04W 36/00* (2009.01)
*H04W 36/02* (2009.01)
*H04W 36/14* (2009.01)

(52) U.S. Cl.
CPC .......... *H04W 36/0072* (2013.01); *H04W 36/02* (2013.01); *H04W 36/14* (2013.01)

(58) Field of Classification Search
CPC .................... H04W 36/0011; H04W 36/0016; H04W 36/0022; H04W 36/0027; H04W 36/0033; H04W 36/0038; H04W 36/0044

USPC ........ 370/331–334; 455/432.1–433, 436–444
See application file for complete search history.

(56) References Cited

U.S. PATENT DOCUMENTS

| | | | |
|---|---|---|---|
| 7,697,935 B2 * | 4/2010 | Guyot et al. | 455/443 |
| 8,432,872 B2 * | 4/2013 | Swaminathan | 370/331 |
| 2003/0114158 A1 * | 6/2003 | Soderbacka et al. | 455/436 |
| 2003/0169725 A1 * | 9/2003 | Ahmavaara et al. | 370/352 |
| 2008/0192697 A1 | 8/2008 | Shaheen | |
| 2009/0023448 A1 * | 1/2009 | Attar et al. | 455/436 |

(Continued)

FOREIGN PATENT DOCUMENTS

| | | |
|---|---|---|
| EP | 1392077 | 2/2004 |
| WO | 01/28160 | 4/2001 |

(Continued)

OTHER PUBLICATIONS

S. Gundavelli et al., Netwrok Working Group, Proxy Mobile IPv6, RFC 5213, Aug. 2008.

(Continued)

*Primary Examiner* — Thai Hoang
(74) *Attorney, Agent, or Firm* — Squire Patton Boggs (US) LLP (57) ABSTRACT

A method and a device for data processing in a mobile communication network are provided, wherein a control information is conveyed between a mobile terminal and an anchor node within said mobile communication network, and wherein based on said control information, a handover synchronization between a source network and a target access network is conducted utilizing an intermediate state of a mobility management. Furthermore, a communication system is suggested comprising said device.

16 Claims, 4 Drawing Sheets

(56) References Cited

U.S. PATENT DOCUMENTS

| | | | | |
|---|---|---|---|---|
| 2009/0129342 | A1* | 5/2009 | Hwang et al. | 370/331 |
| 2009/0196254 | A1* | 8/2009 | Cha et al. | 370/331 |
| 2009/0290556 | A1* | 11/2009 | Taaghol | 370/331 |
| 2010/0323700 | A1* | 12/2010 | Bachmann et al. | 455/436 |

FOREIGN PATENT DOCUMENTS

| | | |
|---|---|---|
| WO | 2008/100488 | 2/2008 |
| WO | 2008/079063 | 7/2008 |
| WO | 2008/154310 | 12/2008 |

OTHER PUBLICATIONS

J. Postel, Network Working Group, Internet Control Message Protocol, DARPA Internet Program Protocol Specification, RFC 792, Sep. 1981.

D. Johnson et al., Network Working Group, Mobility Support in IPv6, RFC 3775, Jun. 2004.

3rd Generation Partnership Project; Technical Specification Group Services and System Aspects; Architecture enhancements for non-3GPP accesses (Release 8), 3GPP TS 23.402 V8.2.0, Jun. 2008.

3rd Generation Partnership Project; Technical Specification Group Services and System Aspects; General Packet Radio Service (GPRS) enhancements for Evolved Universal Terrestrial Radio Access Network (E-UTRAN) access (Release 8), 3GPP TS 23.401 V8.0.0, Dec. 2007.

3rd Generation Partnership Project; Technical Specification Group Services and System Aspects; General Packet Radio Service (GPRS); Service description; Stage 2 (Release 8), 3GPP TS 23.060 V8.1.0, Jun. 2008.

3rd Generation Partnership Project; Technical Specification Group Services and System Aspects; General Packet Radio Service (GPRS) enhancements for Evolved Universal Terrestrial Radio Access Network (E-UTRAN) access (Release 8), 3GPP TS 23.401 V8.4.1, Dec. 2008.

3GPP LTE Release—Global Initiative.

* cited by examiner

METHOD AND DEVICE FOR DATA PROCESSING IN A MOBILE COMMUNICATION NETWORK

BACKGROUND OF THE INVENTION

1. Field of the Invention

The invention relates to a method and to a device for data processing in a mobile communication network and to a system comprising such a device.

2. Description of Related Art

Figure 1:
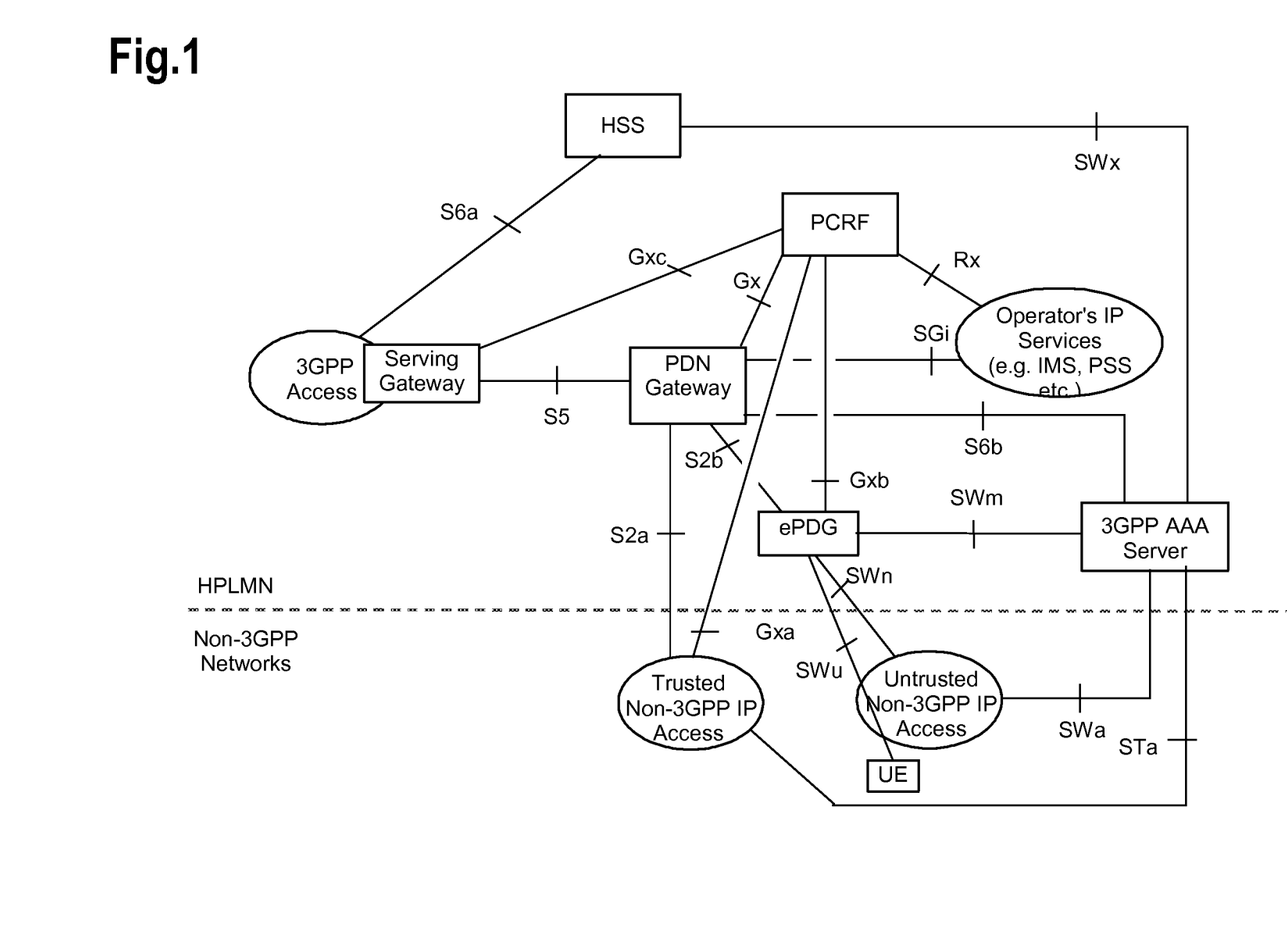
FIG. 1 shows interfaces and components of a non roaming architecture for the evolved packet core network.

3GPP defines in release 8 (Rel.8) an architecture for the packet core. A System Architecture Evolution (SAE) describes how a packet core network can be extended to integrate non 3G accesses into the system architecture. FIG. 1 shows interfaces and components of a non roaming architecture for the evolved packet core network according to specification 3GPP TS 23.402 V8.2.0, entitled "Architecture enhancements for non-3GPP accesses".

The specification of the evolved packet core describes how the specific characteristics of heterogeneous access networks can be hidden from a mobile user. Access network convergence implies a similar "look and feel" experience for the application regardless of the type of access that is currently used by a (mobile) device.

Service continuity among those heterogeneous access networks is one of the prominent features, which is expected to increase the popularity of Rel.8 as well as upcoming versions. Also, service continuity may speed up a deployment of associated or required network components.

A PDN-GW represents a gateway node for the packet core towards an external network. It may also comprise an anchor function for trusted and/or un-trusted non 3G access networks with the support of a network based mobility protocol PMIP (Proxy Mobile IP according to IETF RFC 5213, entitled "Proxy Mobile IPv6Client based MIPv6") (see interfaces S2a and S2b in FIG. 1).

For an un-trusted access, a VPN tunnel can be used with an evolved Packet Data Gateway (ePDG) representing a tunnel endpoint on the core network side. Mobility support by the user equipment (UE) is also addressed by IETF RFC 3775, entitled "Mobility Support in IPv6". The respective interface S2a (not shown in FIG. 1) is also terminated in the PDN-GW regarding the non roaming case.

Even though handover between heterogeneous accesses has been specified as part of SAE, there are problems regarding a handover procedure due to unsynchronized events. It is further not defined as how to react to changed conditions in the new network. Hence, the UE does not know when to switch between a non 3G access network and a 3G access network. As not all end devices may be able to maintain simultaneous IP connectivity among several interfaces, a UE may have to switch IP connectivity between the non 3G interface and the 3G interface. If the UE switches such connectivity too early, packets received on the non 3G access could be lost. On the other hand, if such switching is conducted too early, packets may have already been delivered via the 3G access without the required connectivity being established. As a result, packets get lost.

In addition it is not apparent to the UE for the handover from the non 3G access to the 3G access whether the reservation was successful and how many resources could be reserved per data flow to be transferred.

The problem to be solved is to overcome the disadvantages stated above and in particular to provide an efficient approach to synchronize handover between a 3G access network and a non 3G access network.

SUMMARY OF THE INVENTION

This problem is solved according to the features of the independent claims. Further embodiments result from the depending claims.

In order to overcome this problem, a method is provided for data processing in a mobile communication network,
- wherein a control information is conveyed between a mobile terminal and an anchor node within said mobile communication network;
- wherein based on said control information, a handover synchronization between a source network and a target access network is conducted utilizing an intermediate state of a mobility management.

This solution enables a mobile terminal (e.g., a UE) to decide whether or not to initiate handover for its bearers or a selection thereof. Pursuant to said control information, the mobile terminal becomes aware of the resources and is able to assess whether the resources meet the requirement of a handover. Hence, the mobile terminal may be handed over from the source to the target network.

Advantageously, this approach allows for converged networks.

Said mobile terminal may in particular support several interface types.

The mobile communication network may be a 3G network, a cellular network or a network according to a 3GPP specification and/or standard.

In an embodiment, the target network is, or is associated with, a 3G access network.

In another embodiment, the source access network is a non 3G access network and the target access network is a 3G access network.

Hence, a handover from the non 3G access to the 3G access can efficiently be synchronized based on the control information conveyed between the mobile terminal and the anchor node (preferably, said anchor node being a part of the 3G network).

It is further noted that mobile terminal may refer to any terminal comprising a wireless interface, in particular to a mobile phone, a personal digital assistant (PDA), a computer with a mobile interface, etc. The mobile terminal may also be referred to as user equipment (UE). The mobile terminal may request and/or utilize several bearers with different IP addresses.

Examples provided in the context of the current solution may use terms of LTE/SAE of 3GPP. However, the concept also applies to other access systems, e.g., to 3G UMTS. The basic LTE/SAE architecture is described in, e.g., 3GPP TS 23.401.

According to a further embodiment, in the intermediate state, resources requested are reserved along the path between the mobile terminal and the anchor node.

In a next embodiment, the resources requested are reserved to be used for transferring data.

In particular, said resources requested may not yet be used for transferring data (packets).

It is also an embodiment that at least one secondary PDP context for an application running on the mobile terminal to be transferred to the target access network at least temporarily comprises such intermediate state.

Hence, the mobile terminal may inform the peer node prior to switching the connection. This bears the advantage that the old connection is still active and can be used to convey such message indicating the peer, e.g., to buffer data transmission until a new connection is set up and running.

Such initiation of a secondary context may comprise the step of reserving a PDP context along the network path, which may or may not be used by the mobile terminal or by the anchor node.

Pursuant to another embodiment, the mobile terminal is informed about the intermediate state via a flag conveyed with a secondary PDP context activation message or via an out-of-band control signaling.

Hence, the mobile terminal becomes aware of the reserved resource (PDP context) before actually using it. The mobile terminal can efficiently decide whether or not the resources available suffice for processing handover (regarding at least one or in particular all bearer(s)).

According to a next embodiment, said flag is forwarded by intermediate nodes along the path between the mobile terminal and the anchor node.

The flag may in particular be forwarded without any modification.

According to another embodiment, said out-of-band signaling refers to at least one bearer and to the secondary PDP context activation message.

According to a further embodiment, said out-of-band signaling is processed via an IP connectivity that is established between the mobile terminal and the anchor node.

For out-of-band signaling, ICMP can be used.

According to an embodiment, said anchor node is a gateway, in particular a PDN-GW.

Pursuant to a further embodiment, the mobile terminal is informed via said control information about resource conditions of the target access network, in particular the 3G access network.

According to an embodiment, the mobile terminal withdraws a handover request for at least one bearer in case the resource requested cannot be allocated.

According to another embodiment, the mobile terminal informs an application to adapt to changed resource conditions in the target access network in case the resource requested cannot be allocated.

Hence, e.g., a bandwidth restriction could be conveyed to the application to convey information of a potentially restricted resource after the handover. Hence, the application may duly change a coding scheme or, e.g., reduce a resolution which would require less bandwidth.

The problem stated above is also solved by a device comprising a and/or being associated with a processor unit and/or a hard-wired circuit and/or a logic device that is arranged such that the method as described herein is executable thereon.

According to an embodiment, the device is a communication device, in particular being a or being associated with a network component, e.g., an anchor node or a mobile terminal.

The problem stated supra is further solved by a communication system comprising the device as described herein.

DETAILED DESCRIPTION OF THE INVENTION

Figure 2:
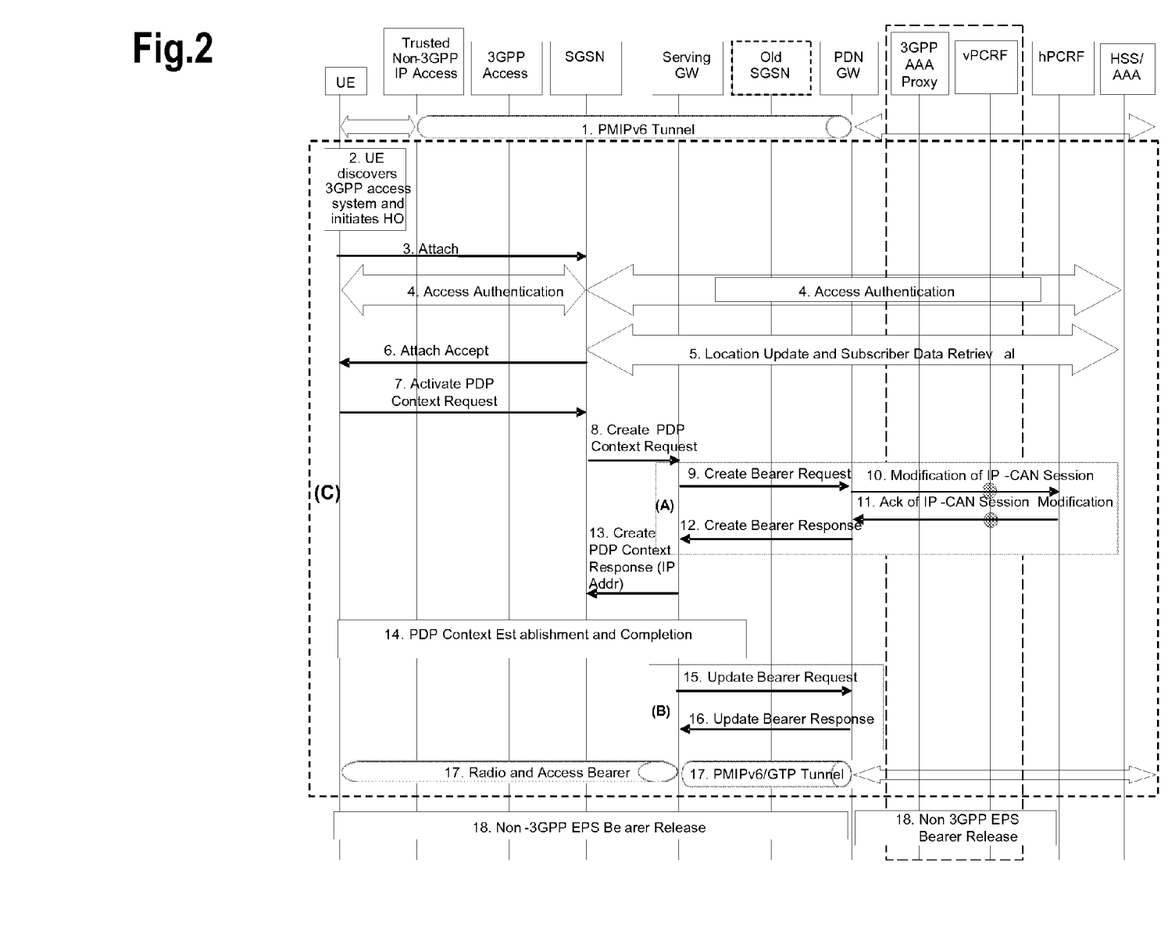
FIG. 2 shows a message flow for handover from a non 3G access network to a 3G access network based on 3GPP TS 23.402 V8.2.0.

FIG. 2 shows a message flow for handover from a (e.g., trusted) non 3G access network to a 3G access network based on 3GPP TS 23.402 V8.2.0. Problems in particular become apparent in view of steps 13 and 14 of the message flow shown in FIG. 2.

Pursuant to FIG. 2, in a step 1, the UE uses a trusted non-3GPP access system and is being served by a PDN GW. In a step 2, the UE discovers the 3G access system and determines to transfer its current sessions. Then, the UE successfully attaches to the newly discovered interface (steps 3 to 6). As shown by steps 7 and 8, the UE initiates an establishment of a primary PDP context (as set forth, e.g., in 3GPP TS 23.060 V8.1.0). The Serving GW sends a "Create Bearer Request"-message to the PDN-GW (see, e.g., 3GPP TS 23.401 V8.0.0). The PDN-GW may not switch the tunnel from non-3GPP IP access to 3GPP access system at this point (step 9).

The PDN-GW sends a message to a Policy and Charging Rules Function (PCRF) to obtain rules required for the PDN GW to work as a policy enforcement point (see steps 10 and 11). The primary PDP context has then been successfully established and the IP address can be allocated to the UE (see step 13).

However, in this situation for a network based mobility solution, the same IP address may still be allocated for the 3G access, being already in use for the non 3G case, because the IP address has been initially allocated by the PDN-GW, which serves as anchor node. The client node may not use a Mobile IP Protocol (MIP, based on, e.g., IETF RFC 3775), but instead there can be a proxy node which makes the handover appear transparent by supporting Proxy Mobile IP (PMIP, based on, e.g., IETF RFC 5213).

Hence, no defined behavior is set forth as how a UE may react, if the same IP address (which is assigned via the non 3G interface) is assigned again via the 3G access. For example, the UE may abort the handover process and run some exception handling procedure. The primary PDP context may represent a default bearer without explicit resource guarantee. Hence, it may not be used for particular services (e.g., VoIP). As an exemplary behavior in such case, the UE may first release the IP connection on the non 3G access and then request the PDP context from the 3G interface without any guarantee that resources can be allocated. In a worst case scenario, the UE does not obtain any resources from the 3G interface and remains disconnected (in particular if the UE cannot maintain several IP connections via different interfaces).

Consequently, secondary PDP contexts may have to be established before the connection can be switched in a step 14 of FIG. 2.

However, an UE-initiated activation of a secondary PDP context is not suitable, because there are no bearer services for the non 3G connections, which can be mapped to the contexts. For network initiated context activation, the PDN-GW is able to obtain all relevant information about the different bearer services needed, i.e. how many secondary contexts need to be established (one per networking application running on the UE) and the specific attributes related to each secondary context. A particular problem is that there is no triggering information for the UE indicating (a) that all secondary PDP contexts have been successfully established; and/or
(b) whether the resources required by the applications running on the UE could be successfully reserved.

Pursuant to (a), the UE is not synchronized with the switching of the user plane at the network side (see steps 15 and 16). If the UE switches too early, inbound packets via the non 3G access may get lost and outbound packets may not be delivered (for single homed UEs). The same situation occurs, if the UE switches too late. Also, this problem exists for outbound packets. Even if the UE supports multiple IP connections via different interfaces, there is no knowledge available at the UE when to use which of the different interfaces. The connectivity to the network may not completely get lost in case of the UE supporting multiple IP connections, but upstream packets may be delivered with a significant delay.

Pursuant to (b), the UE may not adapt to changed resource conditions in the network.

The approach provided suggests exchanging of control messages between a UE and a 3GPP core network, in particular for the purpose of handover synchronization between a non 3G access and a 3G access.

In addition, the UE may be informed by the network about the actual resource conditions in the 3G access for each bearer, which should be transferred.

As a result of such control messages the user plane between UE and anchor node can be switched in a synchronized way. If the resources requested cannot be allocated, the UE may withdraw the handover request for certain bearers or feed information to applications to adapt to changed resource conditions in the 3G access network.

The mechanism suggested reduces a loss of packets during handover. The handover synchronization can be accomplished between the UE and a mobility anchor node (e.g., a PDN-GW) even though the UE may obtain relevant information via some other node of the, e.g., core network domain.

For the purpose of coordination of resource related information, the UE may communicate with a resource function in the network (e.g., a PCRF), but relevant information could also be exchanged via some other node of the network.

Exchanging said control messages may utilize a secure IP connection via non 3G interface between the UE and the 3GPP network. The UE may inform the network whether it supports concurrent IP connections or just a single IP connection. If the UE can allocate only a single IP address, all bearers will be transferred to the 3G access. Otherwise, the UE may request handover from the network for specific bearers.

After the (primary) PDP context has been established for the UE, the PDN-GW may initiate a secondary PDP context activation. Such at least one secondary context may be preliminarily established, i.e. the resources for each secondary PDP context is reserved along the network path, but it may not yet be used by the UE or by the anchor node. For intermediate nodes, e.g., a Node B, an SGSN, an S-GW, existing procedures for the control plane do not have to be changed. As a result, these nodes may carry additional control information without any need for its interpretation (at the respective node).

To indicate to the UE that a secondary context is preliminarily established, the following mechanisms can be utilized:
(1) The PDP context can be activated via (special) information, e.g., an indicator or a flag. Such information may be conveyed within a protocol field that is not yet being used or it may be conveyed in an additional protocol field to be provided. Advantageously, intermediate nodes (e.g., SGSN, S-GW) interpreting a GTP-C message do not modify such additional information conveyed via indicator or flag in the message.
(2) Out-of band signaling between the core network and the UE via non 3G access can be utilized. This type of signaling may refer to at least one bearer and to the related request IDs of the secondary PDP context activation requests. Such information may arrive at the UE prior to the secondary PDP context activation request so that the UE can identify the context requests to be in a 'preliminary' state.

Figure 3:
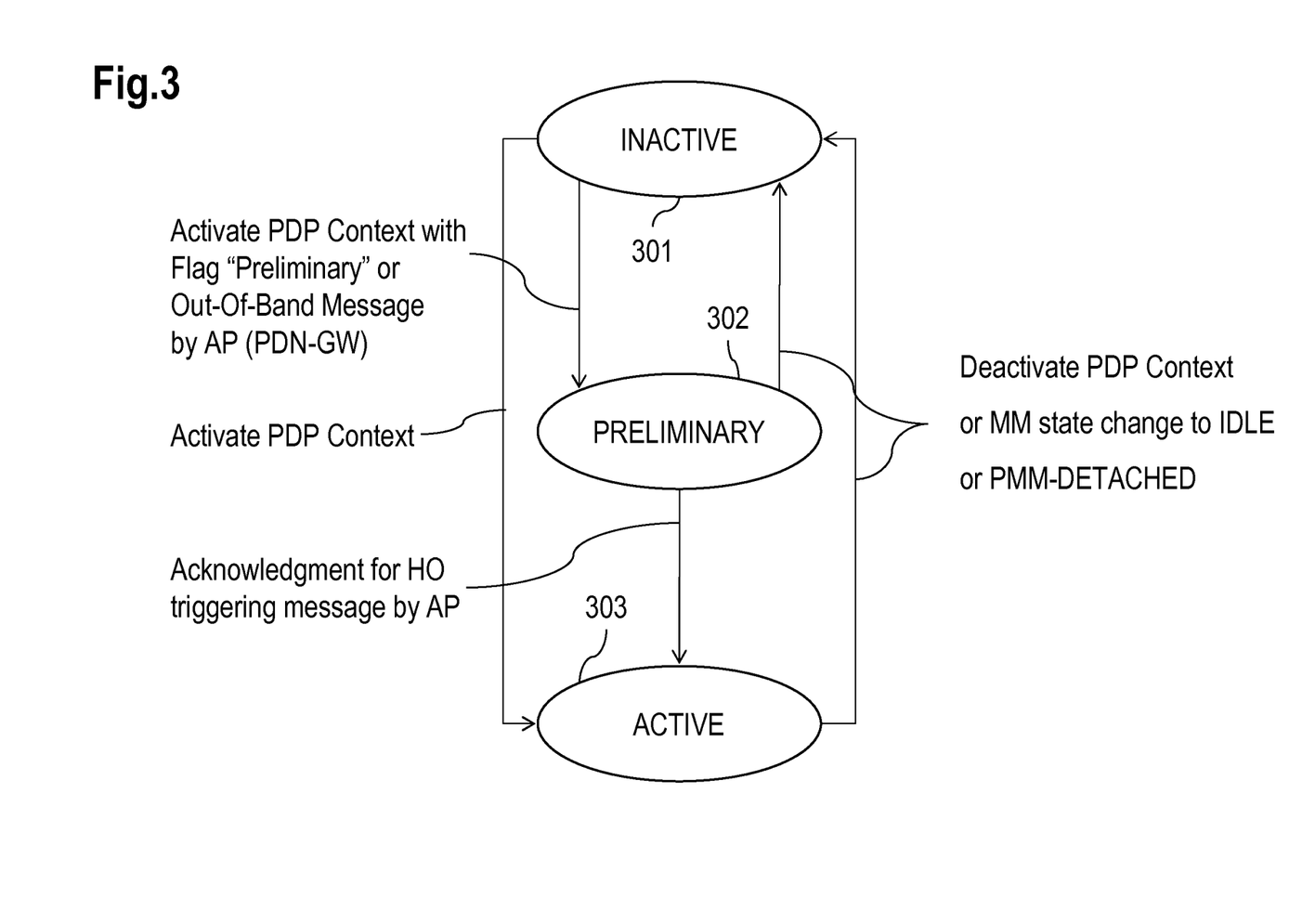
FIG. 3 shows an extended state model for the PDP in the UE comprising the states INACTIVE, PRELIMINARY and ACTIVE.

FIG. 3 shows an extended state model for the PDP in the UE. The state model comprises three states INACTIVE 301, PRELIMINARY 302 and ACTIVE 303. The state INACTIVE 301 may change to the state PRELIMINARY 302 upon activation of the PDP context comprising a flag "Preliminary" or via an out-of-band message by the access point (e.g., the PDN-GW). The state INACTIVE 301 may change to ACTIVE 303 upon activation of a PDP context. The state PRELIMINARY 302 can change to the state ACTIVE 303 based on an acknowledgement for handover triggering message by the access point. The state ACTIVE 303 or the state PRELIMINARY 302 may change into the state INACTIVE 301 upon deactivation of the PDP context or upon a mobility management state change to an idle state or upon a PMM detached message.

If out-of-band signaling is used, IP connectivity may be required for exchanging the control messages. The following mechanisms may apply:
(a) A function can be provided in the anchor node (e.g., in the PDN-GW) so that IP messages can be exchanged with the UE. For such communication, an Internet Control Message Protocol (ICMP) (see, e.g., IETF RFC 792) can be utilized.
(b) The communication can be conducted via some other (supporting) node.

Figure 4:
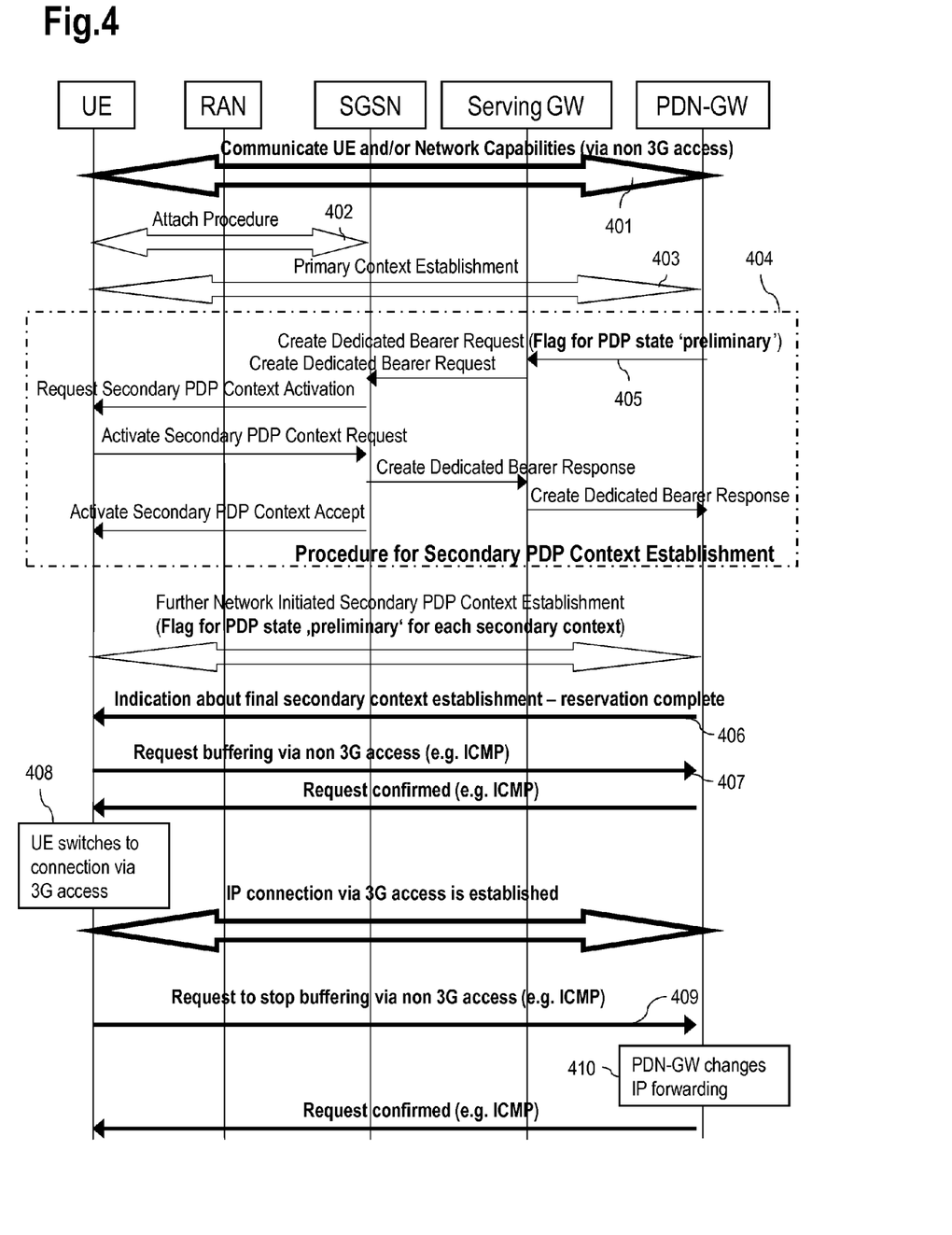
FIG. 4 shows a message flow for a PDN-GW, which implements an additional function to exchange control messages via an IP layer with the UE.

FIG. 4 shows a message flow for a PDN-GW, which implements an additional function to exchange control messages via an IP layer with the UE. FIG. 4 depicts the UE, a RAN, a SGSN, a S-GW and a PDN-GW.

Furthermore, handover may be provided for the mobile terminal and not for individual flows.

At the beginning of the message flow shown in FIG. 4, an IP connection 401 is established between the UE and the PDN-GW to exchange network and terminal capabilities.

The UE and the SGSN process an attach procedure 402. Subsequently, a primary PDP context is established between the UE and the PDN-GW (see message flow 403).

Subsequently, detailed messages to be exchanged for the "Network Requested Secondary PDP Context Activation Procedure using S4" based on 3GPP TS 23.060 (V8.1.0) are illustrated (see block 404). However, this procedure is extended by the aforementioned flag in the GTP-C message provided from the PDN-GW to the S-GW in a message 405.

For each of the established preliminary secondary contexts, the UE can be informed by the network about the resources that will be allocated (not depicted in FIG. 4).

Advantageously, each application running can be uniquely identified so that resources become apparent to be used for each application after the handover.

After the secondary contexts are primarily established, the network indicates that purpose by means of a 'reservation complete' indication message 406, which can be conveyed via an IP connection. A time-out value could indicate to the UE how long the resources are reserved by the network, before the switch of the IP connectivity (to the 3G interface) has to be completed. If no such IP connectivity will be completed within the given time limit (set forth by the time-out value) the resources related to the preliminary established contexts may be released again. The release message in this case can also be triggered by the network.

The reception of the 'reservation complete' indication message 406 triggers the UE to prepare to switch the user plane as indicated by box 408. For this purpose the PDN-GW is requested to buffer downstream packets towards the UE (see message 407). The gateway stops sending user plane packets via the non 3G access and may buffer incoming packets for the UE up to a certain threshold. Finally, when the UE has established the IP connectivity via the 3G access with the PDN-GW, a request to stop buffering 409 is sent, which triggers the PDN-GW to change IP forwarding towards the 3G network (see box 410).

Further Advantages:

The approach described enables synchronization between the UE and an anchor node in the 3G core network (e.g., the PDN-GW) for the handover between the non 3G access and the 3G access. With this synchronization the packet loss can be minimized or avoided, which is especially an advantage for UEs with single IP connectivity. Also for UEs with simultaneous IP connectivity it is important to synchronize with the anchor node, i.e. to know when the 3G access can be used for outbound traffic.

The UE can thus prepare for minimizing or even avoiding packet loss. For any packets to be transmitted by the UE, the UE may indicate to the running applications to halt transmission until the new connectivity has been established. In addition or as an alternative, the UE may inform the peer node of an application to halt data transmission before the connectivity is switched. For downstream packets also a re-transmission mechanism can be used or the UE may request buffering of packets up to a certain threshold during switching of the IP connectivity.

The UE knows in advance about possible resource reductions and can prepare in advance to adapt to a lower transmission scheme (e.g., less bandwidth could be anticipated by using a different codec).

Advantageously, no changes are required regarding the GTP procedures at intermediate nodes in the 3G RAN and the core network (i.e. Node B, RNC, SGSN, S-GW). The PDN-GW and the UE may be supplied by an updated implementation of the GTP. Hence an implementation of this approach can be deployed in a cost-efficient way.

LIST OF ABBREVIATIONS

3GPP 3rd Generation Partnership Project
AP Access Point
ePDG evolved Packet Data Gateway
GGSN Gateway GPRS Support Node
GPRS General Packet Radio Service
GTP GPRS Tunneling Protocol
HO Handover
ICMP Internet Control Message Protocol
IP Internet Protocol
LTE Long Term Evolution
MIP Mobile IP
MM Mobility Management
MME Mobility Management Entity
PCRF Policy and Charging Rules Function
PDN-GW Packet Data Network Gateway
PDP Packet Data Protocol
PMIP Proxy Mobile IP
PMM Packet Mobility Management
RAN Radio Access Network
RFC Request for Comment (IETF norm)
SAE System Architecture Evolution
SGSN Serving GPRS Support Node
S-GW Serving Gateway
TCP Transmission Control Protocol
UE User Equipment
VoIP Voice over IP

We claim:

1. A method for data processing in a mobile communication network, comprising:
    establishing a first primary context between a mobile terminal and a gateway via a source network;
    conveying control information between the mobile terminal and an anchor node comprising a command to establish a secondary context in an intermediate state within said mobile communication network, wherein the control information enables the mobile terminal to decide whether or not to initiate handover for its bearers;
    based on said control information, conducting a handover synchronization between the source network and a target access network in the intermediate state of the mobile communication network;
    buffering downstream packets to the mobile terminal prior to the handover synchronization, via the anchor node;
    establishing a Packet Data Protocol (PDP) context between the mobile terminal and the gateway via the target access network; and
    forwarding packets to the mobile terminal after the handover synchronization and establishment of a direct IP connection between the mobile terminal and the anchor node.

2. The method according to claim 1, wherein the source access network is a non 3G access network and the target access network is a 3G access network.

3. The method according to claim 1, wherein in the intermediate state, resources requested are reserved along the path between the mobile terminal and the anchor node.

4. The method according to claim 3, wherein the resources requested are reserved to be used for transferring data.

5. The method according to claim 1, wherein at least one secondary PDP context for an application running on the mobile terminal to be transferred to the target access network temporarily comprises the intermediate state.

6. The method according to claim 5, wherein the mobile terminal is informed about the intermediate state via a flag conveyed with a secondary PDP context activation message or via an out-of-band control signaling.

7. The method according to claim 6, wherein said flag is forwarded by intermediate nodes along the path between the mobile terminal and the anchor node.

8. The method according to claim 6, wherein said out-of-band signaling refers to at least one bearer and to the secondary PDP context activation message.

9. The method according to claim 6, wherein said out-of-band signaling is processed via an IP connectivity that is established between the mobile terminal and the anchor node.

10. The method according to claim 6, wherein said out-of-band signaling is processed by an Internet Control Message Protocol.

11. The method according to claim 6, wherein said anchor node is a gateway, in particular a Packet Data Network Gateway (PDN-GW).

12. The method according to claim 6, wherein the mobile terminal is informed via said control information about resource conditions of the target access network.

13. The method according to claim 6, wherein the mobile terminal withdraws a handover request for at least one bearer in case the resource requested cannot be allocated.

14. The method according to claim 13, wherein the mobile terminal informs an application to adapt to changed resource conditions in the target access network in case the resource requested cannot be allocated.

15. A device comprising:
- a memory: and
- a processor;
- wherein said memory and said processor are configured to cause said device to perform at least the following:
- establish a first primary context between a mobile terminal and a gateway via a source network;
- convey control information between the mobile terminal and an anchor node comprising a command to establish a secondary context in an intermediate state within a mobile communication network, wherein the control information enables the mobile terminal to decide whether or not to initiate handover for its bearers;
- based on the control information, conduct a handover synchronization between the source network and a target access network in the intermediate state of the mobile communication network;
- buffer downstream packets to the mobile terminal prior to the handover synchronization, via the anchor node;
- establish a PDP context between the mobile terminal and the gateway via the target access network; and
- forward packets to the mobile terminal after the handover synchronization and establishment of a direct IP connection between the mobile terminal and the anchor node.

16. A method, comprising:
- establishing a first primary PDP context with a gateway (GW);
- establishing secondary contexts in an intermediate state between an anchor node and a mobile terminal to reserve one or more resources for a handover from a first network to a second network based on control information comprising a command that enables the mobile terminal to decide whether or not to initiate handover for its bearers;
- requesting the GW to buffer downstream packets via the first network;
- establishing PDP context with the GW via the second network; and
- requesting the GW to forward packets via the second network and establishing a direct IP connection between the mobile terminal and the anchor node.

* * * * *